Jan. 14, 1969  R. W. FRANK ET AL  3,422,422

METHOD OF AND APPARATUS FOR FREQUENCY DISPLAY

Filed Nov. 5, 1964  Sheet _1_ of 2

INVENTORS
RICHARD W. FRANK
GORDON R. PARTRIDGE

BY  Rines and Rines

ATTORNEYS

United States Patent Office 3,422,422
Patented Jan. 14, 1969

3,422,422
METHOD OF AND APPARATUS FOR
FREQUENCY DISPLAY
Richard W. Frank, Concord, and Gordon R. Partridge,
Sudbury, Mass., assignors to General Radio Company,
West Concord, Mass., a corporation of Massachusetts
Filed Nov. 5, 1964, Ser. No. 409,074
U.S. Cl. 340—347                                12 Claims
Int. Cl. H04l 3/00; G06f 7/38; H03k 13/00

ABSTRACT OF THE DISCLOSURE

Frequency display apparatus having processing means for converting a signal comprising a plurality of successive cycles, each of duration less than approximately one-half second and thus too short to permit digital display, into a corresponding plurality of electric impulses separated by periods of less than approximately one-half second and having means including a flip-flop controlled by the processing means, a source of timed pulses, and an AND circuit for producing a number of timed electric pulses throughout an interval corresponding to the period between successive impulses. The number of timed pulses is counted and converted into an analog current or voltage for substantially instantaneous display during the next such interval. A pair of counting registers may be employed in association with a matrix to produce counting and displaying during each such interval, rather than alternate intervals. Noise immunity may be provided by a spill flip-flop associated with each counting register to terminate any output from the matrix.

---

The present invention relates to methods of and apparatus for frequency display and, more specifically, to apparatus for measuring frequencies of signals comprising a plurality of successive cycles each of period too short to permit reading or printing a digital display during any such period.

There are occasions, as in connection with the monitoring of frequency-modulated pulses and the like, where it is important to determine the frequency or period of successive cycles of a signal containing a plurality of such cycles. While conventional digital and other frequency-measuring apparatus have been evolved for measuring the average number of impulses produced during the monitoring of several cycles of a signal, the above problem requires the actual determination of the period or frequency of a single cycle, or a predetermined portion thereof, for which this multiple-cycle averaging technique is entirely unsuited. In addition, it is desirable to produce a display or other indication following the counting of a number of impulses during a single cycle of a multiple-cycle signal, or a predetermined portion thereof, in a period of time that is far too short to permit of conventional digital display techniques. In the case of a changing signal the pattern of which is to be monitored in order to determine, for example, the change of frequency in the successive cycles of the signal, anything less than a large fraction of a second (say, from one-tenth to one-half of a second between successive cycles) just cannot be read or comprehended by an observer using digital display techniques.

An object of the present invention, accordingly, is to provide a new and improved method of and apparatus for enabling the display of the number of impulses counted during a single cycle of a signal containing a plurality of successive cycles the period of each of which is too short to permit of such digital display; and, in summary, this end is achieved through a novel reconversion of the number of impulses thereof to an analogous current or voltage that is suitable for substantially instantaneous display.

A further object of the invention is to provide a new and improved frequency or period meter.

Other and further objects will be explained hereinafter and will be more particularly pointed out in connection with the appended claims.

In summary, however, the invention contemplates a method wherein a signal that contains a plurality of successive cycles that may be of changing frequency during each cycle is monitored, with the period of the successive cycles of the signal being (as before-explained) too short to permit of digital display during any such period; a train of impulses is generated, having a repetition rate such that a large number of said impulses will occur during any such cycle or predetermined portion thereof; the number of impulses produced during one such cycle or predetermined portion thereof is determined; and that number is converted into an analogous current or voltage for substantially instantaneous display. In one form of the invention, the impulse counting may be stopped during the next cycle of the signal; but, in another form embodying a duplicate counting register, the impulses from the second register are caused to effect a number count during the next successive cycle.

The invention will now be described in connection with the accompanying drawing, FIG. 1 of which is a block diagram illustrating a system operating in accordance with the principles of the invention;

Figure 1:
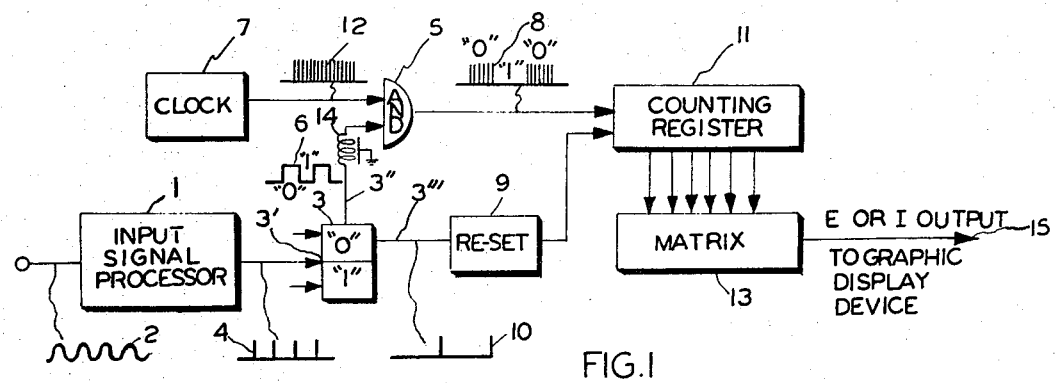

Referring to FIG. 1, a multicycle input signal of the character described (cycle duration less than approximately one-half second) is shown at 2, monitored by an input processing circuit 1, such as a conventional impulse counter-generator, to produce a train of impulses 4 that may correspond to successive cycles of the input signal 2, or some predetermined portion thereof and that are separated by periods of less than approximately one-half second. The impulses 4 are applied to the complement input 3' of a flip-flop stage 3, the "0" and "1" portions of which are appropriately so-labeled. There will thus result at the "0" output 3" of the flip-flop 3 the relatively wide pulse waveform shown at 6, the positive pulses of which correspond to conduction of the "0" flip-flop section and define intervals corresponding to the periods between successive impulses 4. The pulses 6 are fed by conductor 3" to an input of an AND gate 5 into which timing impulses 12 of much shorter period are fed from a clock generator 7. The output of the AND gate 5 is shown at 8 comprising the pluralities of the clock pulses 12 that are admitted through gate 5 while waveform 6 is in the "0" state and a display or quiescent interval "1" therebetween.

The number of impulses contained in the first "0" interval of waveform 8 represents, thus, a count of the first cycle, or some predetermined portion thereof, of the signal 2, and the impulse counting has ceased during the next cycle of signal 2 (region "1" of waveform 8), or predetermined portion thereof. The third cycle of the input signal 2, however, has also been counted; then a quiescent interval elapses during the next cycle; and so on. At the termination of every two cycles of the input signal 2, an impulse 10 is produced at the output 3''' of the "0" section of flip-flop stage 3 to trigger a conventional resetting circuit 9 for a counting register 11. A delay device, such as, but not limited to, a delay line 14 postpones the start of a counting interval until this resetting operation is completed. The reset counting register 11 receives the output 8 of the AND gate 5 and counts the number of impulses during the "0" intervals illustrated in waveform 8 and corresponding to the first and third cycles of the input signal 2. In accordance with the present invention, this count is transferred through a resistive or other matrix 13 to convert the registered number of impulses into an analogous current or voltage.

The output analog current or voltage may be substantially instanteneously displayed on a cathode-ray tube or other graphic display schematically represented at 15, showing the changing nature of the signal 2 in terms of the period of every other cycle of that signal 2. This display would not otherwise have been possible in the absence of the conversion at 13 in the case of signals that, as before stated, have less than from approximately one-tenth to approximately one-half second period per cycle of signal, since an operator cannot visually interpret any digital display within such a short period of time.

Figure 2:
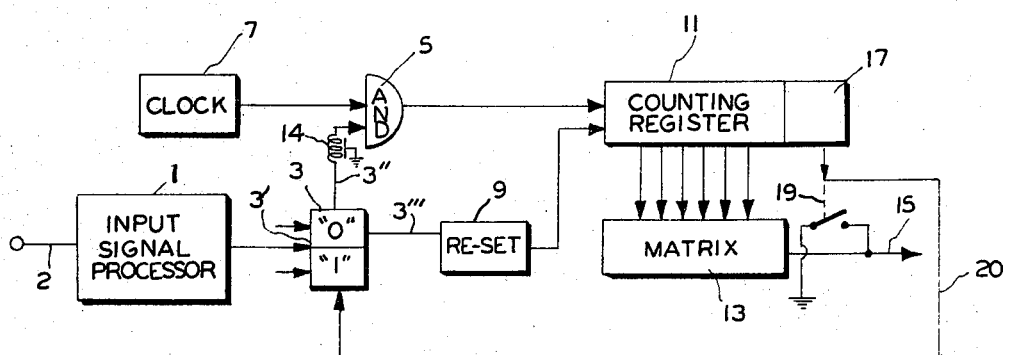
FIG. 2 is a similar diagram of a modification.

FIG. 2 shows a preferred modification in which an additional spill flip-flop 17 of the set-reset type is added to the counting register 11. When the register 11 becomes full, the spill flip-flop 17 sets and applies an output signal along 19 that, in any conventional fashion, disables the matrix output 13, as indicated by the schematic grounding of the output signal. The output of flip-flop 17 is also applied by conductor 20 to reset flip-flop 3 to "0" and thus cause circuit 9 to reset the counting register 11 to zero and simultaneously effecting closing of the AND gate 5.

Spill flip-flop 17 thereby essentially establishes a lower limit on the frequency which can be measured and enables the counting system to ignore a single spurious pulse, such as an undesired input noise spike. This improvement thus reduces the effects of noise on the measurement.

Figure 4A:
FIGS. 4A–4C are explanatory waveforms at different portions of the circuit of FIG. 3.
Figure 4B:
Figure 4C:
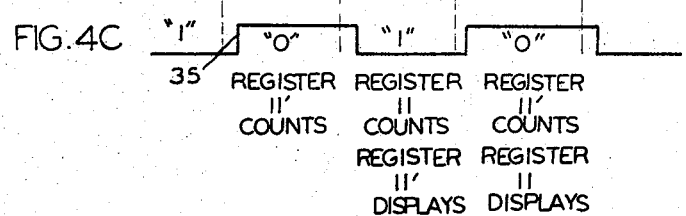
Figure 3:
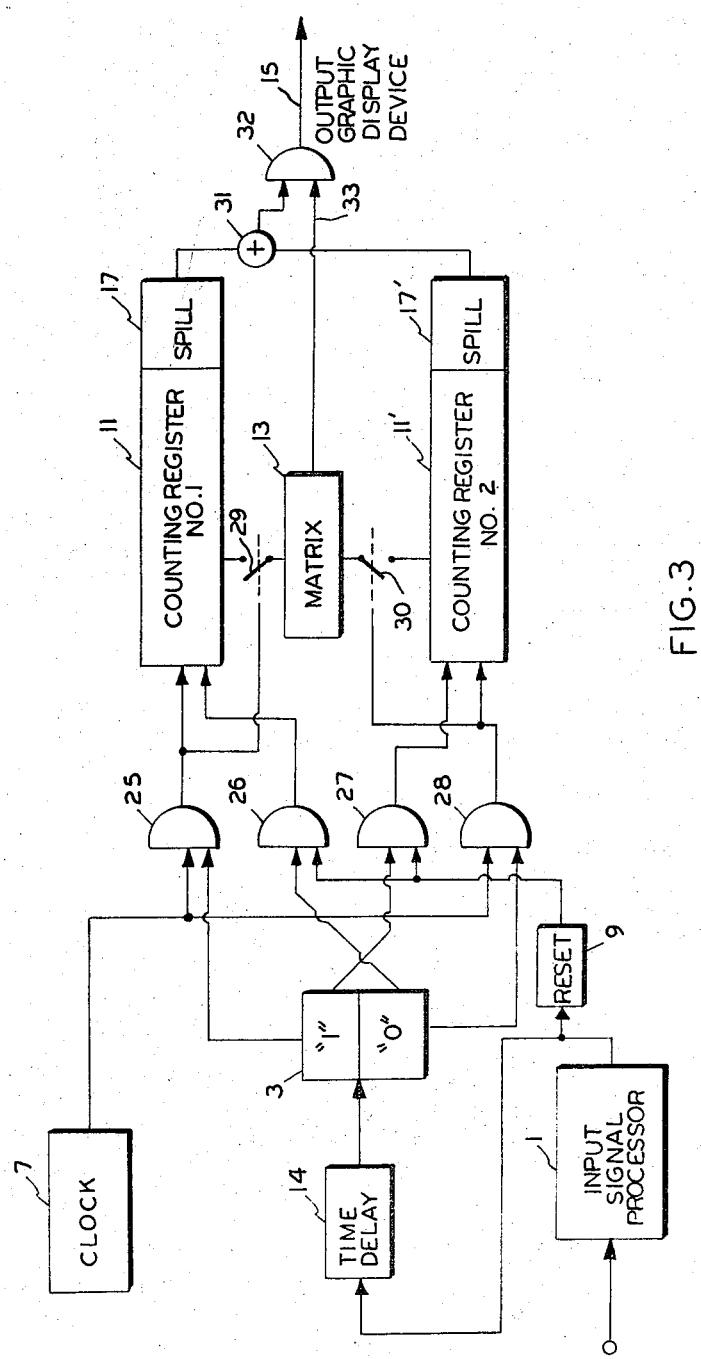
FIG. 3 is a block diagram of a further modification for each cycle counting and display.

In FIG. 3, an extension of the same basic system of FIGS. 1 and 2 is illustrated. The objective in FIG. 3 is still to make a high-speed essentially single cycle or fractional cycle measurement of frequency by digital means and to convert that frequency measurement back to an analog quantity, either voltage or current, for subsequent display; but the system of FIG. 3 permits the display of the frequency of each cycle during the next succeeding cycle and thereby permits the display of the frequency information on a continuous basis with no cycles lost as in the embodiment of FIGS. 1 and 2. Again, input circuits 1 accept the signal-to-be-measured and process that signal to pulses once per cycle, or once per half cycle or the like. The timing diagram FIGS. 4A–4C shows the input signal at 22, FIG. 4A, and the pulse derived therefrom, corresponding approximately to zero crossing, at 23, FIG. 4B.

To begin the explanation of the operation of FIG. 3 let it be assumed that flip-flop 3 is in the "1" state. Under these conditions an AND gate 25 passes impulses from a clock 7 into a counting register 11. An AND gate 28 is closed and a counting register 11' is connected to a matrix 13 via a path controlled by the gate 28, shown symbolically as switch 30. An AND gate 27 is open; and an AND gate 26 is closed. Under these conditions the counting register 11' stores the number of impulses counted during the previous cycle or predetermined portion thereof and the matrix 13 converts said count in the register 11' to an analogous voltage or current which is delivered to the output graphic display device through a gate 32 via a conductor 33. Now let it be assumed that a pulse 23', shown in FIG. 4B, is produced by the input signal processor 1. This pulse proceeds with substantially zero time lag through the AND gate 27 causing the register 11' to be reset and disconnecting the matrix 13 from counting register 11' by opening the symbolic switch 30. These events occur at the moment of time represented by the first dotted line in FIG. 4B. After a sufficient time delay to permit the events associated with resetting to proceed to completion, said delay produced by a device such as, but not limited to, a delay line 14, flip-flop 3 changes from a "1" to a "0" state, as shown by line 35 on FIG. 4C. Immediately subsequent to the transition at time line 35, counting register 11' begins accumulating impulses from the clock 7 via AND gate 28. The AND gate 26 opens to await the next reset pulse, and the AND gate 25 closes to stop the flow of impulses into counting register 11, and a symbolic switch 29 closes to connect register 11 to matrix 13. The output of matrix 13 is fed to the output graphic display device 15 via the conductor 33 and the AND gate 32 as previously described. After the passage of time corresponding to a full cycle of waveform 22 or a predetermined portion thereof, the input signal processor 1 generates pulse 23" shown in FIG. 4B. This pulse passes through the AND gate 26 causing the register 11 to be reset. After the time delay produced by the delay line 14, the flip-flop 3 returns to the "1" state; the symbolic switch 29 is opened; the AND gate 25 admits clock impulses to counting register 11; the reset AND gate 26 closes, and the gate 27 opens to prepare counting register 11' for the next reset pulse. Then the gate 28 closes, stopping the flow of clock impulses to register 11', and the symbolic switch 30 closes admitting the stored count in register 11' to matrix 13, where it is converted to a voltage or current and displayed in the output graphic display device 15, as previously described.

Now let it be supposed that the register 11 is counting as a result of the flip-flop 3 having been put into the "1" state at some previous time by a noise pulse. Eventually the register 11 will be completely filled, and the next impulse entering said register from clock 7 via AND gate 25 will cause the set-reset spill flip-flop 17 to enter its "set" state. OR gate 31 driven by spill flip-flop 17 closes AND gate 32 so that when any other impulse from the signal processor 1 calls for the display via matrix 13, conductor 33, and gate 32 of the count stored in register 11, gate 32 will be prevented from delivering an output to the graphic display device. In this manner the system of FIG. 3 combats noise in substantially the same way as the system of FIG. 2. Had counts initiated by a noise impulse been accumulating in register 11' via AND gate 28, spill flip-flop 17' would disable AND gate 32 via OR gate 31 in the same manner that has just been described for the action of spill flip-flop 17. Thus, spill flip-flops 17 and 17' serve to combat noise in this system in a manner equivalent to flip-flop 17 in FIG. 2.

Further modifications will obviously occur to those skilled in the art and all such are considered to fall within the spirit and scope of the invention as defined in the appended claims.

What is claimed is:

1. Frequency display apparatus having, in combination, signal processing means for converting a signal comprising a plurality of successive cycles into a corresponding plurality of impulses, means for producing a number of times pulses throughout an interval corresponding to the period between successive of said impulses, means for counting the said number, and means for converting the counted number into an analogous current or voltage for substantially instantaneous display, the pulse producing means comprising flip-flop means connected to the processing means, a source of timed pulses, and AND gate means connected to the flip-flop means and the said source, the counting means comprising a counting register and the converting means comprising a matrix connected to the counting register, and means for rendering the counting register insensitive to noise signals and similar single impulses not followed by successive cycles, the rendering means comprising spill flip-flop means connected to the counting register for producing an output that is fed to terminate any output from the matrix and to close the AND gate.

2. Apparatus as claimed in claim 1 and in which the said spill flip-flop output is fed to the first-named flip-flop means, and reset means is provided between the first-named flip-flop means and the counting register.

3. Apparatus as claimed in claim 2 and in which spill flip-flop means is connected to the counting registers.

4. Apparatus as claimed in claim 2 and in which time delay means is provided between the processing means and the first-named flip-flop means.

5. Frequency display apparatus having in combination, signal processing means for converting a signal comprising a plurality of successive cycles, each of duration less than approximately one-half second, into a corresponding plurality of electric impulses separated by periods of less than approximately one-half second, means for producing a number of timed electric pulses throughout an interval corresponding to the period between successive impulses, means for counting the said number during the said interval, means for converting the counted number into an analog current or voltage for substantially instantaneous display, and means for displaying said current or voltage as an analog display during the next such interval.

6. Apparatus as claimed in claim 5, and in which the timed pulse producing means comprises flip-flop means connected to the processing means, a source of said timed pulses, and AND gate means connected to the flip-flop means and said source.

7. Apparatus as claimed in claim 6 and in which the counting means comprises a counting register and the converting means comprises a matrix connected to the counting register.

8. Apparatus as claimed in claim 7 and in which means is provided for rendering the counting register insensitive to noise signals and similar single impulses not followed by successive cycles.

9. Apparatus as claimed in claim 5, said counting means comprising a pair of separate counting registers, said apparatus having means for rendering said registers operative to count timed electric pulses during intervals corresponding to alternate periods in order that the number of timed pulses produced during one interval and counted by one register may be displayed during the next interval while the number of timed pulses produced during such next interval is being counted by the other register.

10. Apparatus as claimed in claim 9 and in which the pulse-producing means comprises flip-flop means connected to the processing means, a source of timed pulses, and AND gate means connected to flip-flop means and the said source.

11. Apparatus as claimed in claim 5 and further comprising means associated with said means for converting said signal into a plurality of electric impulses for resetting said counting means automatically after said conversion of said counted number.

12. Apparatus as claimed in claim 5 and including means for rendering the counting means operative to count timed electric pulses only during intervals corresponding to alternate periods.

References Cited

UNITED STATES PATENTS

| | | | |
|---|---|---|---|
| 2,405,597 | 8/1946 | Miller | 175—368 |
| 2,840,709 | 6/1958 | Blankenbaker | 250—27 |
| 3,219,935 | 11/1965 | Morisaburo Katakami | 328—28 |
| 3,221,250 | 11/1965 | An Wang | 324—78 |

MAYNARD R. WILBUR, *Primary Examiner.*

G. EDWARDS, *Assistant Examiner.*

U.S. Cl. X.R.

235—92